US012608396B2

(12) United States Patent
    Kesavapillai

(10) Patent No.: US 12,608,396 B2
(45) Date of Patent: Apr. 21, 2026

(54) CENTRALIZED PRODUCT CATALOG WITH STANDARDIZATION FROM INDEPENDENT DATA SOURCES

(71) Applicant: ORACLE INTERNATIONAL CORPORATION, Redwood Shores, CA (US)

(72) Inventor: Magesh Kesavapillai, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/668,371

(22) Filed: May 20, 2024

(65) Prior Publication Data

US 2025/0355893 A1      Nov. 20, 2025

(51) Int. Cl.
    *G06F 16/25*       (2019.01)
    *G06F 16/215*      (2019.01)
    *G06F 16/28*       (2019.01)

(52) U.S. Cl.
    CPC .......... *G06F 16/258* (2019.01); *G06F 16/215* (2019.01); *G06F 16/285* (2019.01)

(58) Field of Classification Search
    CPC .... G06F 16/258; G06F 16/215; G06F 16/285; G06F 16/1794; G06F 16/217; G06F 11/3409; G06G 16/1794
    See application file for complete search history.

(56) References Cited

U.S. PATENT DOCUMENTS

| | | | | |
|---|---|---|---|---|
| 6,523,019 B1 * | 2/2003 | Borthwick | ............. | G06N 20/00 |
| | | | | 706/45 |
| 8,122,026 B1 * | 2/2012 | Laroco, Jr. | ............... | G06N 5/04 |
| | | | | 707/730 |
| 8,131,756 B2 * | 3/2012 | Carus | ...................... | G06F 16/36 |
| | | | | 707/776 |
| 2022/0058227 A1 * | 2/2022 | Balakrishnan | ........... | G06N 3/09 |

OTHER PUBLICATIONS

Tom Gruber; Ontology, in the Encyclopedia of Database Systems, Ling Liu and M. Tamer Ozsu (Eds.), Springer-Verlag, 2009; 1 pg. Intelligent Medical Objects Staff; Ontology's importance in EHR Workflows; from www.imohealth.com; Published Mar. 3, 2022; pp. 1-4.

* cited by examiner

*Primary Examiner* — Kavita Stanley
*Assistant Examiner* — Cecile H Vo
(74) *Attorney, Agent, or Firm* — Kraguljac Law Group LLC

(57) ABSTRACT

Systems, methods, and other embodiments associated with a centralized product catalog with standardization from independent data sources are described. In one embodiment, a computing system is configured to access and download product information for a plurality of products that is maintained in a non-standard format. Metadata is identified and extracted. Feature vectors may be generated from the metadata and used to predict and assign class codes to products. The product attributes are extracted from each product, which include a non-standard product description. The non-standard product description is converted into a (Continued)

standardized text description. Standardized records are generated for each product record and a centralized database is generated with the standardized records.

20 Claims, 6 Drawing Sheets

400

CENTRALIZED PRODUCT CATALOG WITH STANDARDIZATION FROM INDEPENDENT DATA SOURCES

BACKGROUND

Today's information about medical devices and medical drugs are decentralized and not curated. This also applies to many other industries. Different sources of product data exist on unrelated database systems that are maintained by different entities. As such, the different sources are configured as isolated systems and operate independently of each other. These prior systems lack integration and/or communication with each other or with other systems that may attempt to access the databases. This leads to inefficiencies in the databases and fragmented data management. Since the source systems are independent, each source system typically includes product data descriptions that are inconsistent with other systems even when describing the same device or drug. Data inconsistencies and/or inaccuracies have also been found within a single database.

Each separate source system (e.g., each product manufacturer or product supplier) typically maintains their product data in a non-standard data format that is different from other data formats from other source systems, even when they contain similar data. For example, two different product suppliers may have databases that contain data on the same or similar products, but the product data is organized and formatted differently and includes different product descriptions.

The non-uniformed format of the data creates issues for user systems that attempt to access and retrieve data since the user system must be configured to recognize the custom format of each different source database system. Some users may not be aware that similar data may be available from other independent systems.

The configuration of these isolated database source systems creates silos amongst any type of consumer systems that use and rely on the product data. This may include product suppliers, distributors, vendors, purchasers, and end user systems. Data silos occur when data are stored in separate databases or separate systems causing them to be accessible only in a specific manner due to their customized data formatting and organization. These silos increase the cost of any system that uses the databases. For example, silos in healthcare product data increases the cost of healthcare systems and decreases the accuracy of medical information obtained from the disparate source systems. Data silos in energy and utility industries create disconnected data between power plants, grids, sensors, and/or consumer meters. This prevents energy companies from efficient grid management, performing predictive maintenance and energy conversation. Data silos in the automobile industry create challenges among various trading partners, including manufacturers, suppliers, distributors, retailers, service providers, and/or regulatory bodies. These isolated systems hinder synchronization, efficient collaboration and decision-making. The present system aims to address and remediate one or more of these issues.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
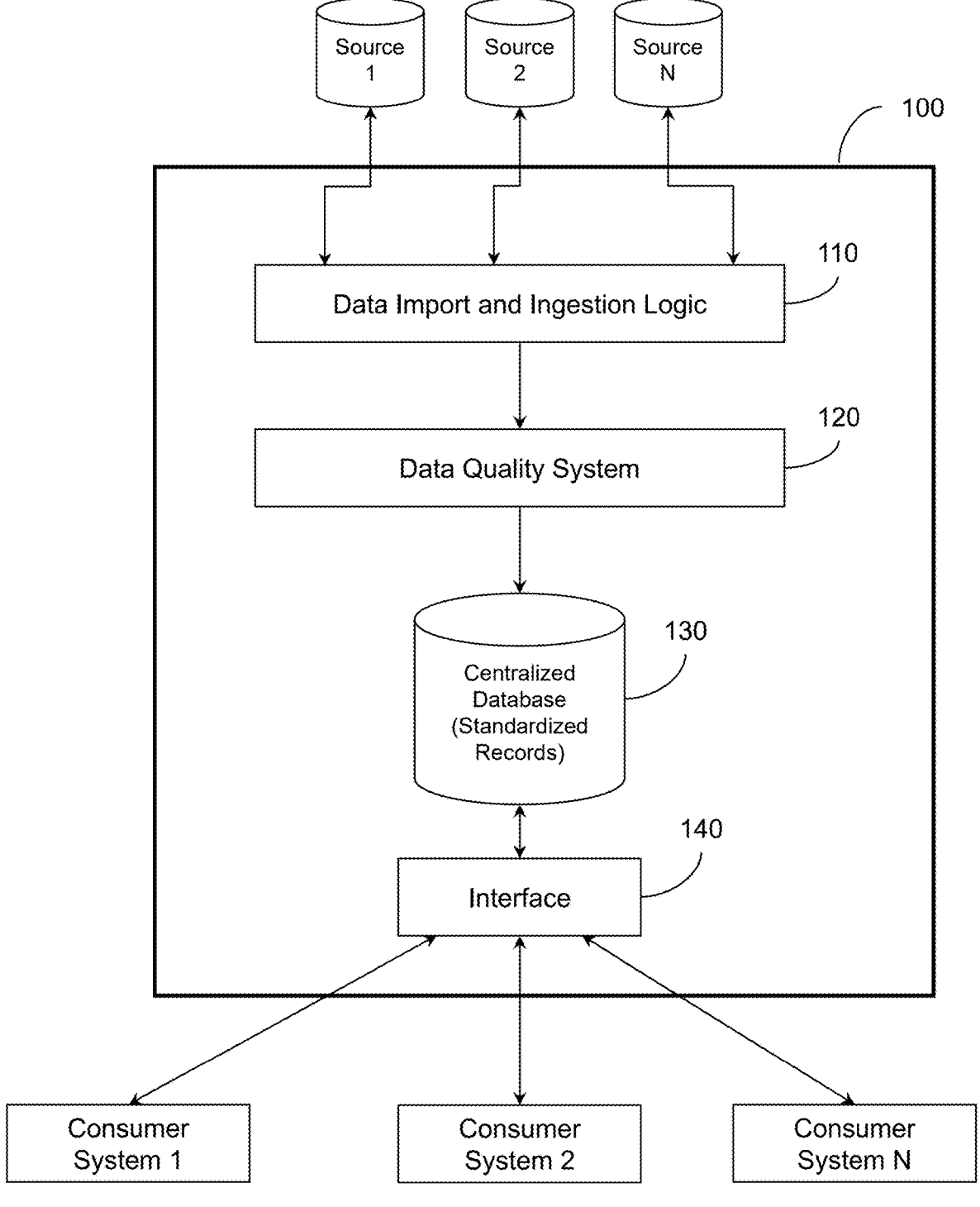
FIG. 1 illustrates one embodiment of a system associated with a catalog system that generates a centralized database of product records in a standardized form.

Systems and methods are described herein that generate a centralized database of product information in a standardized format from multiple independent data sources containing non-standard or non-uniform data.

In one embodiment, the present system may be implemented as a Data-as-a-Service (DaaS) system that aggregates, curates, transforms/standardizes, enriches, centralizes and provides access to one or more types of product data. In a healthcare industry embodiment, the product data may include, but are not limited to, medical devices, durable medical equipment, medical surgical supplies, and/or pharmaceutical and manufactured drug data. In another embodiment involving electronics industry, the product data may include, but are not limited to, semiconductors, sensors, wires and cables, optoelectronic products, electromechanical products, connectors, resistors, capacitors, rheostats, and/or power packs. The present system may be implemented in other industries with different product data in other embodiments. The system may be configured to provide cloud-based network access to aggregated standardized product data to consuming systems, for example, suppliers, consumers, provider systems and ERP systems. The standardized product data from disparate systems may be regarded as being updated and synchronized with each other into a uniformed manner to provide real-time (or near real-time) access to the updated product data to remote users.

In one embodiment, the present system may be configured as a centralized online product catalog that is an integrated repository where information pertaining to particular types of products is stored and managed in a standardized format in a single, unified system. The centralized online catalog may encompass a wide range of product data including, but not limited to, product descriptions, pricing, specifications, availability, supplier data, and multimedia content such as images and videos of products. The centralized and standardized nature of the catalog facilitates uniformity, accessibility, and manageability of product data across an entire industry.

Prior independent and non-standard product databases have technical difficulties not only from a configuration aspect but also from a searchability aspect. Simply retrieving data from multiple independent sources and storing the non-standard data in a database is not workable since each data source uses a non-standard file format and/or record format. By simply combining such disparate records, multiple different types of data records and data formats would exist making a system unmanageable and be a large burden on data quality services.

Definitions

GUDID (Global Unique Device Identification Database) is a database managed by the U.S. Food and Drug Administration (FDA) that serves as a repository of key device identification information for medical devices having Unique Device Identifiers (UDI). The FDA assigns product codes to categorize devices into groups based on similar characteristics like intended use or indications for use. These codes may be three to five character codes and are not unique to specific models but to broader categories of devices. For example, a product class code "LZA" categorizes patient examination gloves or "PHV" categorizes continuous glucose monitors. The GUDID is a data source that may be accessed via network communications (e.g., internet access) using one or more APIs.

UNSPSC (United Nations Standard Products and Services Code) is a global classification system that provides an open, standardized multi-sector coding system for goods and services. The UNSPSC assigns class codes to goods and services in a hierarchical framework with four levels (highest/broadest to lowest/specific): Segment, Family, Class, and Commodity. The class codes are generally numeric values such as "432115", which corresponds to computers and belongs to a family code of "4321" representing computer equipment and accessories.

System Embodiment

With reference to FIG. 1, one embodiment of a product catalog system 100 is illustrated that is associated with generating and building a centralized database of standardized product data. The following description is explained with reference to products relating to medical devices and medical drug data but other types of product data from other industries may be used.

The catalog system 100 provides a one-stop solution that consolidates diverse healthcare product data from independent sources that contain non-standardized product information. Since the independent sources maintain their product information in separate locations and in different non-standard data formats, this is problematic for many technical reasons including not being readily shared or accessible by users, and the disparate data cannot be simply stored together and consolidated due to data format inconsistencies. There is inherent complexity and problems associated with configuring and adapting multiple components of a computer system to handle multiple forms of data records from different independent systems, which have different data formats. This is an apparent problem when functioning with multiple systems.

The conversion of such disparate data records into a standard format by the present system allows all other components of the computer system to be configured based on the standard format, thus simplifying the technical complexity of the computing system. For example, the standardized data format of the product data records simplifies and improves indexing and searching. The standardized database 130 generated by the present system 100 may then be accessed by a uniformed interface 140 and associated network connections. The interface 140 may include one or more APIs that allow remote users via consuming systems (e.g., consuming system 1, 2 . . . . N) to access, search, and retrieve data in a uniformed manner.

In one embodiment, the catalog system 100 may be implemented for healthcare related products. For healthcare related products and its data, the independent data sources may include, but are not limited to, the FDA's Global Unique Device Identification Database (GUDID), United Nations Standard Products and Services Code (UNSPSC) database, Global Medical Device Nomenclature (GMDN) Terms, and/or the European Database on Medical Devices (EUDAMED). Other source databases containing product information may include specific product manufacturer online systems and/or supplier systems.

In one embodiment, the catalog system 100 includes data import and ingestion logic 110 and a data quality system 120 that are configured to import data, transform/convert the data, extract attributes, and generate a centralized database 130 containing standardized product records and product information. This is described in more detail in the following figures.

Data Import and Ingestion Logic Embodiment

Figure 2:
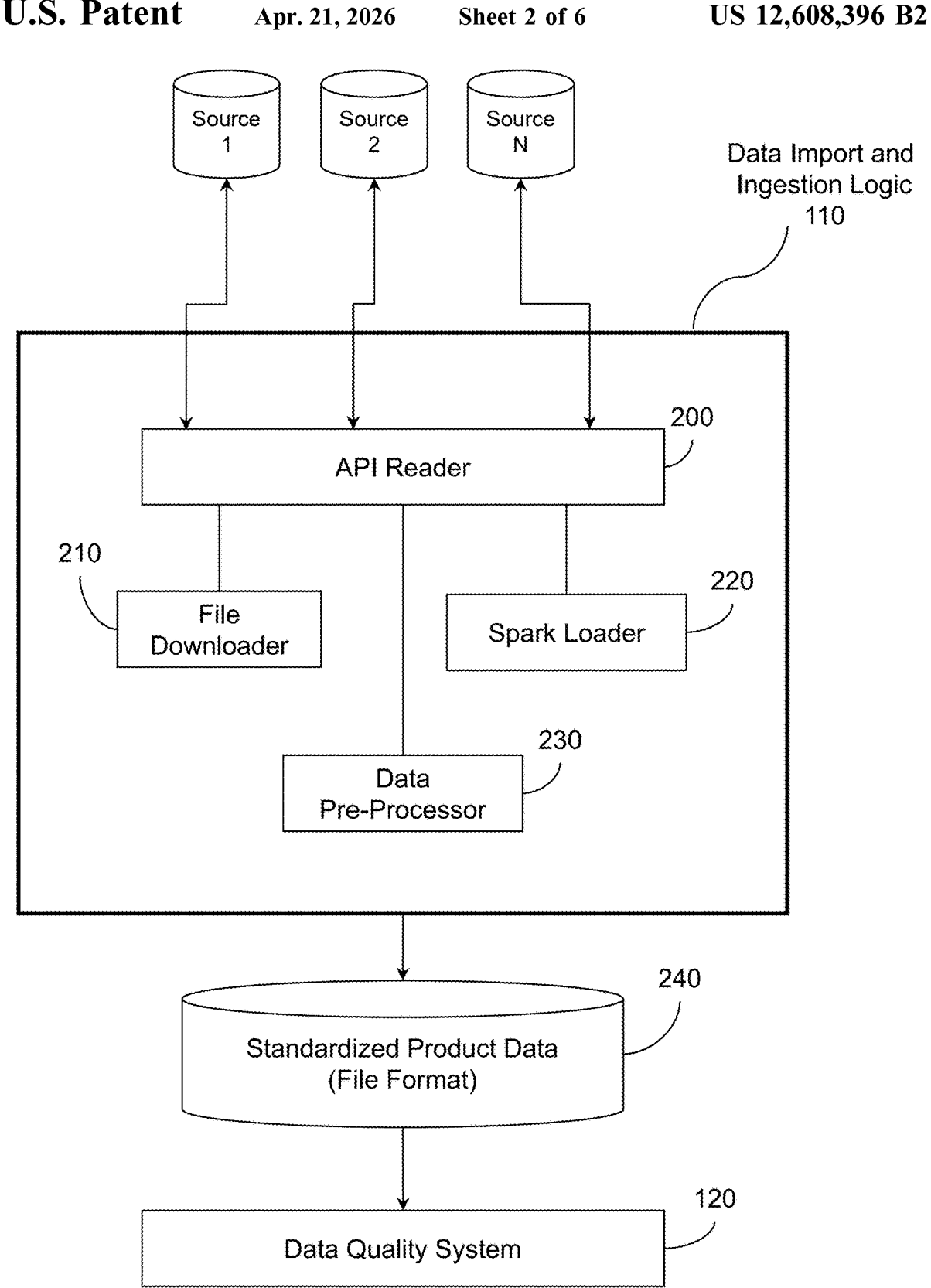
FIG. 2 illustrates one embodiment of a data import system associated with FIG. 1.

With reference to FIG. 2, one embodiment of the data import and ingestion logic 110 is shown. For example, the data import and ingestion logic 110 (from FIG. 1) may be configured with an API reader 200 including data retrieval tools designed to streamline the process of accessing and aggregating data from one or more independent data sources across the internet, for example, data source 1, data source 2 to data source N. APIs (Application Programming Interfaces) may be used to establish connections with each data source and retrieve data records, retrieve product information, and/or download files for analysis, ingestion, and conversion to a standard format as described herein.

The API reader 200 may be configured to support real-time data retrieval and updates from dynamically changing data sources. Automated data fetch tasks may be scheduled and/or triggered by manual updates to stay current with the latest information. In one embodiment, subsequent to new product data being retrieved, standardized, updated, and/or added to the centralized database, an electronic notification may be automatically generated and transmitted to one or more designated users/consuming systems. The electronic notification may serve to notify users that updated data is available in real-time and may provide a link to access the centralized database system 100.

The API reader 200 may operate with a file downloader 210. The file downloader 210 may be a software application or component that facilitates the downloading of files from remote servers or sources onto a local device. A download process may be initiated based on a designated URL (Uniform Resource Locator) or location of a target file that is to be downloaded from one of the data sources (source 1, source 2 . . . . N). This can be performed through a web browser, a dedicated downloader application, or another software interface. After a network connection is established with the data source, a request may be transmitted for the target file (or data records), which is then received by the file downloader 210.

In another embodiment, a spark loader 220 may be included to assist in processing large amounts of ingested data. The spark loader 220 may be configured to distribute processing and optimize data loading operations and to support parallelization to efficiently handle large datasets. For example, the spark loader 220 may process large datasets across many nodes simultaneously, allowing for high-speed processing and analysis of big data.

The spark loader 220 may be configured to recognize the data source format, syntax, and data fields. Thus, the spark loader 220 may then convert/transform the downloaded data into a standard data format or file format. In one embodiment, the downloaded data, which can have a variety of different formats, may be converted into Comma-Separated Values (CSV) format, Pipe-Separated Values (PSV), JSON format, XML format, or other designated data format.

In another embodiment, a data pre-processor 230 may be configured with the data import and ingestion logic 110 and/or part of the spark loader 220 functionality. For example, before transferring the downloaded data into the data quality system 120, the data pre-processor 230 prepares the downloaded data for further processing and/or analysis. For example, various functions may be performed on the downloaded data, which is now in a standard file format such as CSV. Example functions may include, but are not limited to, removing null characters, filling missing or null values with substituted values, cleaning the data (e.g., remove stop words, remove punctuation marks, noise reduction, error correction, etc.), merging data from multiple sources, and/or other desired pre-processing functions.

The converted and cleaned data is then stored as standardized product data 240, which is in a standard file format (e.g., CSV, PSV, JSON, etc.). In general, the standardized product data 240 contains product information for a plurality of products, which may be in the form of data records represented by rows of values separated by commas in the CSV file format, for example. Typically, the product data is unstructured text. Each data record may contain various product information for a particular product that was found from the data source. For example, the product information for a product may include one or more attributes (or combinations of attributes) such as product name, unique product ID, brand name, manufacturer name, product textual description including functions and/or specifications, size and dimensions, material, color, product category or classification, or other type of information that may be included by the data source. This information is regarded as product properties or product attributes herein.

Of course, raw product data from different sources (which is unstructured) does not always have a complete or consistent set of product attributes and values in every product data record since some attributes do not apply to every product or are simply missing from some products. Furthermore, each data row in the CSV file may not contain the same order of attribute values. The following components describe how attributes are extracted and correctly identified.

Data Quality System Embodiment

Figure 3:
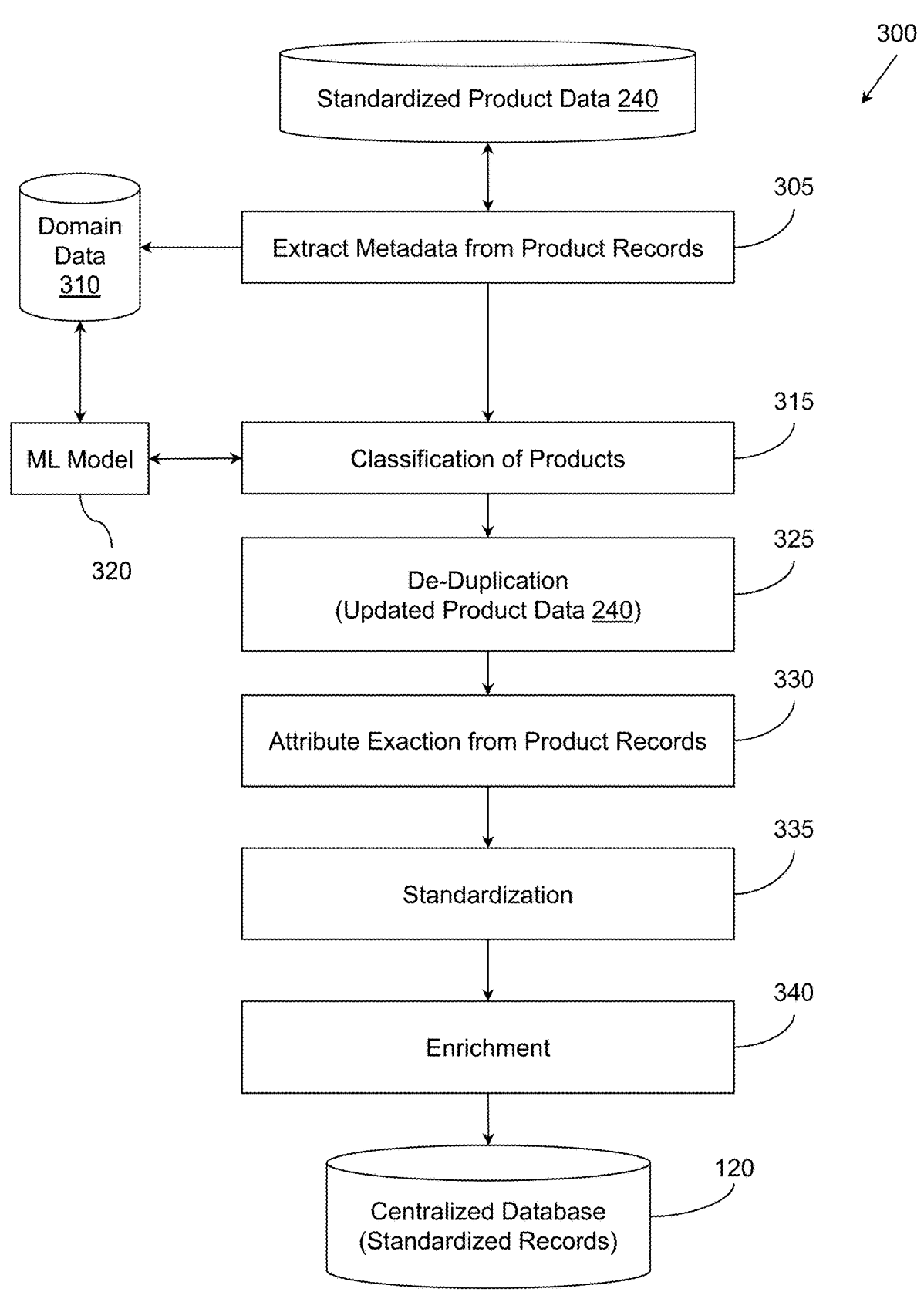
FIG. 3 illustrates one embodiment of a data quality system associated with FIG. 1.

With reference to FIG. 3, one embodiment of the data quality system 120 (from FIG. 1) is illustrated as system 300. FIG. 3 is illustrated with component blocks that represent a set of functions (e.g., a method) that may be performed by the data quality system 120 but also represent system components that are configured to perform the associated function of the block. System 300 and its functions are not limited by the illustrated order or sequence of the blocks. The system components may be implemented as one or more executable software modules, software tools, and/or applications configured with executable instructions for performing the associated function(s).

Metadata Extractor 305: The standardized product data 240 (from FIG. 2) is input to the data quality system 120 and metadata extraction is performed. A set of metadata that is desired by the system may be identified or designated, for example, via a user interface or programmed into the extractor 305 based on the type of product data being input. In one embodiment, for healthcare related products, the set of metadata that is selected may include product brand names, manufacturer names, units of measure (UOM) that are used to describe a product, and/or other type of information. The metadata extractor 305 is configured to identify the selected set of metadata from the product information (product attributes) of a product from the plurality of products and extract the metadata that is identified for an associated product.

In the above example, the select set of metadata includes brand name, manufacturer name, and units of measure (UOM). The metadata extractor 305 may first examine the input data to understand how brand names, manufacturer names, and units of measure are represented. For example, the metadata extractor 305 may identify which columns contain the brand names and manufacturer names. Sometimes, these might not be explicitly named, and some interpretation may be performed based on the data examination.

In one embodiment, the metadata extractor 305 is implemented with a machine learning (ML) model that is trained to identify the types of metadata that the system is interested in finding. The ML model may parse through each of the rows of data from the standardized product data 240 to identify and extract all unique brand names listed. Similarly, the ML model may identify and extract all unique manufacturer names and units of measure.

An example is shown in Table 1 where an unstructured text description is analyzed, which does not specifically identify the metadata attributes being searched for: brand, manufacturer:

TABLE 1

| Unstructured Text to Metadata |
| --- |
| Example 1 |
| Raw Product Description: |
| "XYZ Corp. Adapt O-Life aerosol tee adapter spring loaded valved |
| 15 mm I.D. × 15 mm O.D. The Tee piece connector is designed for |
| connecting to the patient port of the respiratory or anesthesia breathing |
| circuit, or connecting nebulizer and corrugate tube or a mouthpiece." |
| Metadata Found: |
| Brand: Adapt O-life |
| Manufacturer: XYZ Corp. |
| Unit of measure: mm |
| Example 2 |
| Raw Product Description: |
| "PROTEX Angled Lamina Hook, 6.0 mm Rod, Large" |
| Metadata Found: |
| Brand: PROTEX |
| Manufacturer: ABC Corp. |
| Unit of measure: mm |

Based on occurrences and associations found, the ML model may also determine which brand names relate to which manufacturer names. In one embodiment, the ML model of the metadata extractor 305 may also check for consistency in the naming (e.g., 'AcmeCorp' and 'Acme Corp.' may be treated as the same entity). Duplicate names may be removed and deleted from the domain data 310.

The unique values for each type of metadata are stored as domain data 310. Thus, the domain data 310 will include a list of unique brand names, a list of unique manufacturer names, and a list of unique units of measure that were found in the product data. The domain data 310 may contain the unique combinations of metadata found for products such as combinations of brand, manufacturer, and unit of measure.

The domain data 310 may be used in later functions (described below) such as Enrichment, Attribute Extraction and/or Classification. For example, the domain data 310 may be used to associate missing information from new product descriptions that are input to the system 100 and/or the system 100 attempts to recognize, classify, and associate substitute products to other products.

For example, suppose the domain data 310 includes a list manufacturers: Infineon Technologies, Analog Devices, Inc., NXP Semiconductors, etc. During data enrichment process, a product description "32-bit Microcontrollers-MCU 32 BIT AURIX", which is missing manufacturer information, may be automatically associated with the manufacturer "Infineon Technologies" based on relationships from the domain data 310.

In another example, suppose the domain data 310 includes a list of Units of Measure: mm, inch, degree, pound, etc. During Attribute Extraction for a product record, attributes are extracted from following text: Contoured Insert Pad, Wings, Moderate, 13"×24". The unit of measure may be correlated with domain data 310 and updated to replace the quotations representing inches with the actual word "inch" to update the corresponding attributes: Length: 24 inch, Width: 13 inch.

Classification Module 315: After the domain data 310 is completed, the system may perform a classification of products. The classification model 315 is configured to identify and consider classification codes from one or more databases that contain product classifications, for example, GUDID, UNSPSC, etc.

For example, the United Nations Standard Products and Services Code (UNSPSC) is a global classification system that provides an open, standardized multi-sector coding system for goods and services. The UNSPSC assigns class codes to goods and services. The GUDID (Global Unique Device Identification Database) is a database managed by the U.S. Food and Drug Administration (FDA) that serves as a repository of key device identification information for medical devices having Unique Device Identifiers (UDI). The FDA assigns product codes to categorize devices into groups based on similar characteristics like intended use or indications for use. These are typically three to five character codes and are not unique to specific models but to broader categories of devices.

In one embodiment, the classification module 315 includes a classification ML model 320 that is trained and configured to classify products based on known classification codes from GUDID and/or UNSPSC. The classification ML model 320 may be an artificial intelligence (AI) model trained with existing classified products and builds a neural network model based on the classifications of products.

The product classifications may also be added and associated to the list of domains in the domain data 310. As previously stated, the domain data 310 may contain the unique combinations of metadata found for products such as combinations of brand, manufacturer, and unit of measure. For each of these combinations, an associated UNSPSC class code and/or GUDID code may be added and assigned.

The metadata/attribute combinations may be used to generate feature vectors based on the combination of brand, manufacturer, unit of measure, which then have an assigned UNSPSC class code and/or GUDID code.

Thus, when new (unknown/unclassified) product data is ingested, a product classification may not be found in the product information when attributes are extracted. In response to the classification not being found in the product information, the ML model is caused to predict a class code for the product information based on at least a feature vector created from the product information, the classification ML model 320 attempts to predict and classify the product, which does not include a classification in its attributes. The predicted class code may then be assigned to the product and inserted into the corresponding product information.

For example, product data from a manufacturer database (a data source of raw product data) typically may not have a UNSPSC code and class included in the product attributes. The classification ML model 320 may generate a similar feature vector from the attributes that exist in the product data of the new product and perform a matching or prediction function to the known feature vectors of the domain data 310 to predict and assign the correct product classification.

For example, suppose a feature vector is generated for the "Adapt O-Life aerosol tee adaptor" product from Table 1 and it is assigned a class code of 114459. This is contained in the domain data 310. When a new product record is received (that is unclassified) but has a similar product description of:

"Adapt O-Life aerosol tee adapter spring loaded valved 5 mm I.D.×10 mm O.D. The Tee piece connector is designed for connecting to the patient port of the respiratory or anesthesia breathing circuit, or connecting nebulizer and corrugate tube or a mouthpiece."

The classification ML model 320 will predict its classification. A feature vector is generated from the new product description having the same structure as the existing feature vectors from the domain data 310. The new product description differs from the description in Table 1 (the known product) only by the dimensions "5 mm I.D.×10 mm" whereas the Table 1 description has dimensions "15 mm I.D.×15 mm O.D." Thus, the feature vector of the unknown product will substantially match the feature vector of the known product. If this is the closest matching feature vector, the classification ML model 320 will predict that that products are of the same type. As a result, the unknown product will be assigned the same class code of 114459 that is assigned to the feature vector of the known product. As a note, the class codes represent types of products or classes of products and are not unique to specific products. Thus, more than one product can be in the same class and have the same class code.

As new product records are ingested into the system, being able to predict and assign the correct class codes for the new products is beneficial in the final centralized catalog database 120. Consuming systems and users that search the catalog database 120 to identify and purchase products use the class codes to search for specific products. If the class codes for products are incorrect, then search results based on a class code will be incorrect and may include products that the user is not looking for.

An existing problem in the disparate data sources 1, 2, . . . N is that different manufacturers of the same product describe the products differently. For example, one manufacturer may describe a product as "Sterile latex gloves with XYZ material for surgery . . . " Another manufacturer may describe their gloves with a different description and/or with different attributes. Trying to search for latex gloves with particular attributes may produce unpredictable results when searching the non-standardized databases. As with many products, there are different kinds of latex gloves for different purposes, for example, surgical gloves, non-surgical gloves, gloves for gardening, and so on.

Without the class code or if the class code is wrong on a product, a user would have to search for and match the same text words used by the manufacturer, which most likely would not match the text words of another manufacture. Accordingly, it is very difficult for a user to discover the product(s) they are searching for from non-standardized data records.

However, with the present standardized database 120 including assigned class codes for all products, a user can unambiguously search for and find the relevant products from all manufactures by knowing the class code assigned to product type (e.g., sterile gloves). The class code would identify the category of a product, which helps the user discover the correct type of product (e.g., latex gloves for surgery).

De-Duplication Module 325: With continued reference to FIG. 3, the ingested product data 240, which is now in a CSV file format, may be analyzed to remove duplicate data (e.g., duplicate product records). As previously explained, product data from different disparate data sources is described randomly in non-uniformed ways and with non-uniformed schema. For example, a product may be described in inches by one data source but the same product may be described in millimeters by another data source. This can result in duplicate records for the same product. When a duplicate record is found, the duplicate record may be filtered or deleted from the product data 240. In one embodiment, the analysis may be performed based on product classes (class codes) to more easily identify the same product data that is duplicated.

In one embodiment, the de-duplication module 325 may be configured to perform semantic matching of product information (e.g., from the rows of product data in the CSV file) based on semantic text, which may identify duplicate records of the same product. An ML model may be used to identify duplicate records using, for example, natural language processing (NLP) and/or other text recognition algorithms. For example, natural language processing (NLP) may be used to compare product descriptions or features for linguistic similarity.

In another embodiment, records that are identified as duplicates may be marked for review and transmitted to a user interface. By accessing the user interface, a user may review and verify whether records are in fact duplicates prior to being deleted from the product data 240. This may involve a user viewing and verifying whether a flagged record is a duplicate of another existing record. The ML model may also be further trained based on the results of verified duplicates (correctly identified) and results of verified non-duplicates (incorrectly identified). This feed-back data may be used to fine tune and/or retrain the ML model.

The ML model may also analyze digital assets (digital images of products) when product images are included in the downloaded data. Typically, there may be thousands or tens-of-thousands of product records and images from a product data source, which makes it impossible for a human to review for duplicates.

De-duplication can also be applied when new data from a second source database is inputted. If the second source has the same product that already exists (from a first source database), the new product data can be discarded. Upon completion of removing duplicate records, an updated version of the product data 240 remains that has been cleansed and filtered.

Attribute Extraction 330 Module: After the standardized product data 240 is processed to extract metadata and remove duplicates, product attributes for each product are extracted, identified, and transformed into a standardized schema and format. The identified attributes and attribute values are used to create standardized records that are stored in the centralized database 120.

The attribute extraction 330 is a different process with a different result than the previous metadata extraction 305 but includes similar functions for identifying text. In the metadata extraction 305, the domain data 310 is created by extracting selected metadata/attributes simply to identify all the unique different attribute values for selected metadata. That included, for example, all unique brands, unique manufacturer names, unique units of measure, and/or class. A list of the unique values for each metadata was created, which are stored to serve as the domain data 310. Each metadata attribute becomes a "domain" in the domain data. These metadata attributes are not associated to any particular product in the domain data 310.

For the attribute extractor 330, the attributes extracted from each product record are associated with the corresponding product. In one embodiment, the extraction function parses the text from each data row in the standardized product data 240 (e.g., which is in CSV format) to obtain the attribute values for the specific product represented by the data row. In one embodiment, the attribute extraction module 330 is configured to analyze the product textual description from a data row and identify and recognize various attributes the system is interested in. These may include, for example but are not limited to, product name, unique product ID, brand name, manufacturer name, product textual description including functions and/or specifications, size and dimensions (length, width, height, inner diameter, outer diameter), units of measure (UOM), material, color, product category or classification, or other type of information that may be included by the data source.

In one embodiment, the attribute extractor 330 is configured with parser and extraction functions or tools. For example, a Text-to-Text Transfer Transformer (called T5) may be used to extract and recognize specific attributes and their values from unstructured data in the product data 240. Thus, the product attributes contained in a product record may be identified and extracted along with their corresponding values. This process creates specific product records with attribute names and associated attribute values for the specific product being analyzed. Once analysis and attribute extraction is completed for the data rows of the product data 240, a standardization process may be executed.

Standardization Module 335: In one embodiment, after attribute extraction and identification, a standardization module 335 may be used to standardize the non-uniformed raw product text description into a standard text description. The result provides a uniformed structure and textual description of products in a standardized format. In one embodiment, a Text-2-Text algorithm, a generative artificial intelligence (AI) model, a rule-based algorithm, and/or a combination of such tools may be implemented generate standardized text from an input textual description. Rules and/or structure definitions may be defined to control how the standardized textual description will be formatted, which product attributes to use, and what common terms to use.

For example, a standardized product description may be defined with a designated structure/format of: product type with particular terms, material, and size with particular units of measure. Table 2 shows examples of raw product descriptions and possible transformations/conversions to a standardized description and format.

TABLE 2

| Examples of Standardizing Raw Textual Descriptions/Attributes | |
| --- | --- |
| Raw Data | Standardized Description |
| SS Bone Screw 6 mm Orthopedic | Cannulated Bone Screw, Stainless Steel, 6 mm |
| 0.1 inch fully threaded headless screw (cannulated) stainless steel | Cannulated Bone Screw, Stainless Steel, 2.54 mm |
| Cannulated Lag Screw, cortical, stainless steel, 0.2 in | Cannulated Bone Screw, Stainless Steel, 5 mm |
| Cannulated bone screw made of titanium material, 0.15" | Cannulated Bone Screw, Titanium, 3.81 mm |

It is apparent from the "Raw Data" that the product descriptions (which are received from the original data sources) are non-uniformed, inconsistent, and may be randomly different for the same type of product. The Raw Data is not standardized and not synchronized and contains a variety of inconsistent product attributes. A catalog database or online marketplace database with such non-uniformed data makes it very difficult to index and organize, which impacts and creates difficulties for search engines. This also makes it very difficult for a user to search and browse the catalog database because the raw data does not have a uniformed structure or standard-type descriptions.

The standardization module 335 is configured to standardize the text descriptions/attributes into a standard format and/or structure of attributes. In one embodiment, the standardization module 335 is configured to recognize textual descriptions of products, identify which attributes the text refers to, and convert the textual descriptions into a designated standard structure of terminology based on, for example, the type of product and/or the classification of the product. This improves upon the inconsistent data structures of raw data from independent data sources.

As seen in the examples of Table 2, the standardized description is based on a standardized attribute format having a defined order of product attributes, for example, (1) product description with particular terms, (2) material with particular terms, and (3) product size with particular units of measure. The converted data becomes part of the standardized product record for each product. Of course, other product attributes may be included in the standardized product record and different defined orders of attributes may be used than what is shown.

The raw product description, which is randomly described in the Raw Data, is converted to a standardized terminology based on, for example, the product type and/or the product classification. The four screw examples in Table 2 have been converted to a uniform and standardize textual description with the terminology "Cannulated Bone Screw." Thus, the resulting product description uniformly describes all the same products with the same description (the same attribute structure) in a synchronized format. Likewise, the units of measure have all been converted to a standardized millimeter (mm) unit of measure even though the Raw Data uses a variety of different measurement formats.

Thus, the raw data records from the independent data sources are converted and synchronized to create an improved centralized database with improved standardized product data records. In one embodiment, consistent and synchronized product data/descriptions can improve search engine optimization (SEO) by ensuring that all instances of the same product contain the same relevant keywords and information that one or more search engines can index.

In one embodiment, the standardization module 335 is configured with or uses text-to-text transforming software, for example, T5, generative AI models, rule-based algorithms, and/or combinations of such tools. The text-to-text software may be configured to take text input (e.g., the raw product description), parse the text input, recognized words and phrases, identify particular product attributes associated with recognized text, and generate a standardized text output as a result. The standardization module 335 may be designed to transform, summarize, and/or rephrase product text in various ways to obtain a standardized format based on a designated format.

Enrichment Module 340: In another embodiment, the data quality system 300 may include an enrichment module 340. The enrichment module 340 may be configured to identify relationships in the product data between different product attributes and generate/build mappings between related attributes. For example, enrichment module 340 may be configured with two components, one that associates manufacturers and another component that associates substitute products for similar products.

In one embodiment, the enrichment module 340 may identify relationships and associate manufacturers by creating groups of manufacturers. The metadata from the domain data 310 may be used to identify the list of unique manufacturer names. The product data records may be grouped by manufacturer name to identify all products associated with each manufacturer. Manufacturers may be compared to see if they produce similar or overlapping products. This may involve checking if manufacturers share categories, subcategories, or specific product models. The analysis may include searching for explicit relationships between manufacturers, such as parent-subsidiary relations or partnerships. This may involve checking additional database fields or integrating external datasets to identify corporate relationships.

In another embodiment, the enrichment module 340 may identify substitute products that may be used as an alternate to another similar product. This may involve categorizing the products to classify products into broader categories and subcategories based on predefined fields or characteristics (e.g., electronics, apparel). The previously assigned class codes may be used for this function.

Products may then be compared based on their features as found from product attributes to find similarities in textual descriptions, numerical attributes, and/or categorical matching. For example, natural language processing (NLP) may be used to compare product descriptions and/or features for linguistic similarity. This may be the same NLP tool used in the de-duplication module 325. In one embodiment, similarity scoring may be performed to calculate a similarity score for each product pair or group, using algorithms such as cosine similarity for text-based comparisons or Euclidean distance for numerical features.

An example functionality of the relationships may be as follows. A new product record is downloaded by the system and is missing the manufacturer information. The enrichment module 340 may identify and assign a manufacturer name to the product based on the similarities and relationship data that was previously built. Also, for new product records, one or more substitute or alternative products may be assigned to the new product. This may include adding one or more column fields in the product data record that identifies the substitute products and defines substitute product mappings. In another embodiment, a relationship matrix may be generated that maps relationships between manufacturers and/or between substitute products. Thus, when a user searches the centralized database 120 for a product and search results are returned, the results may also identify substitute products to give the user additional choices.

The final database is the centralized product database 120 containing standardized product records from multiple non-standardized data sources.

Figure 4:
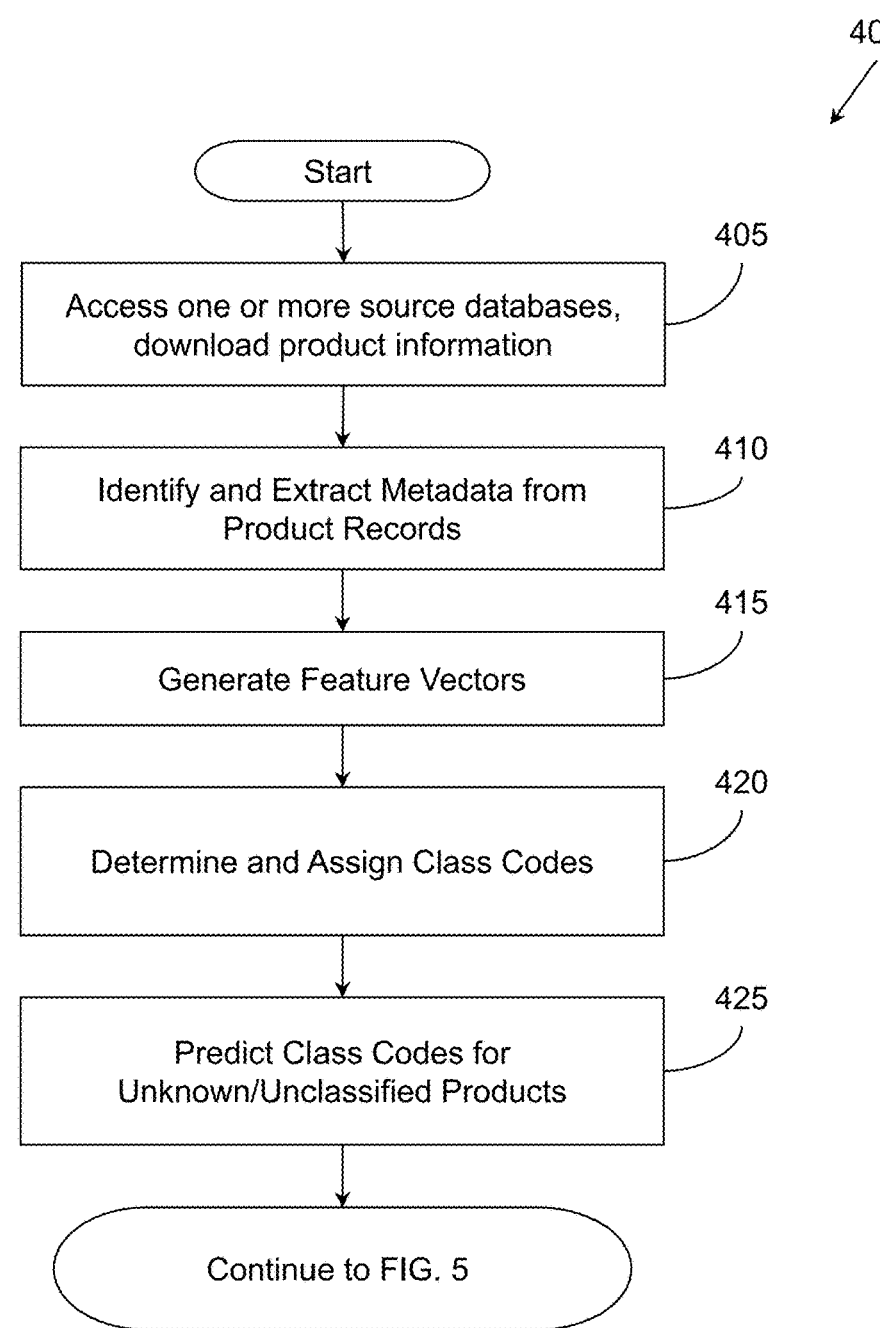
FIG. 4 illustrates one embodiment of a method system associated with downloading data and training a machine learning model.
Figure 5:
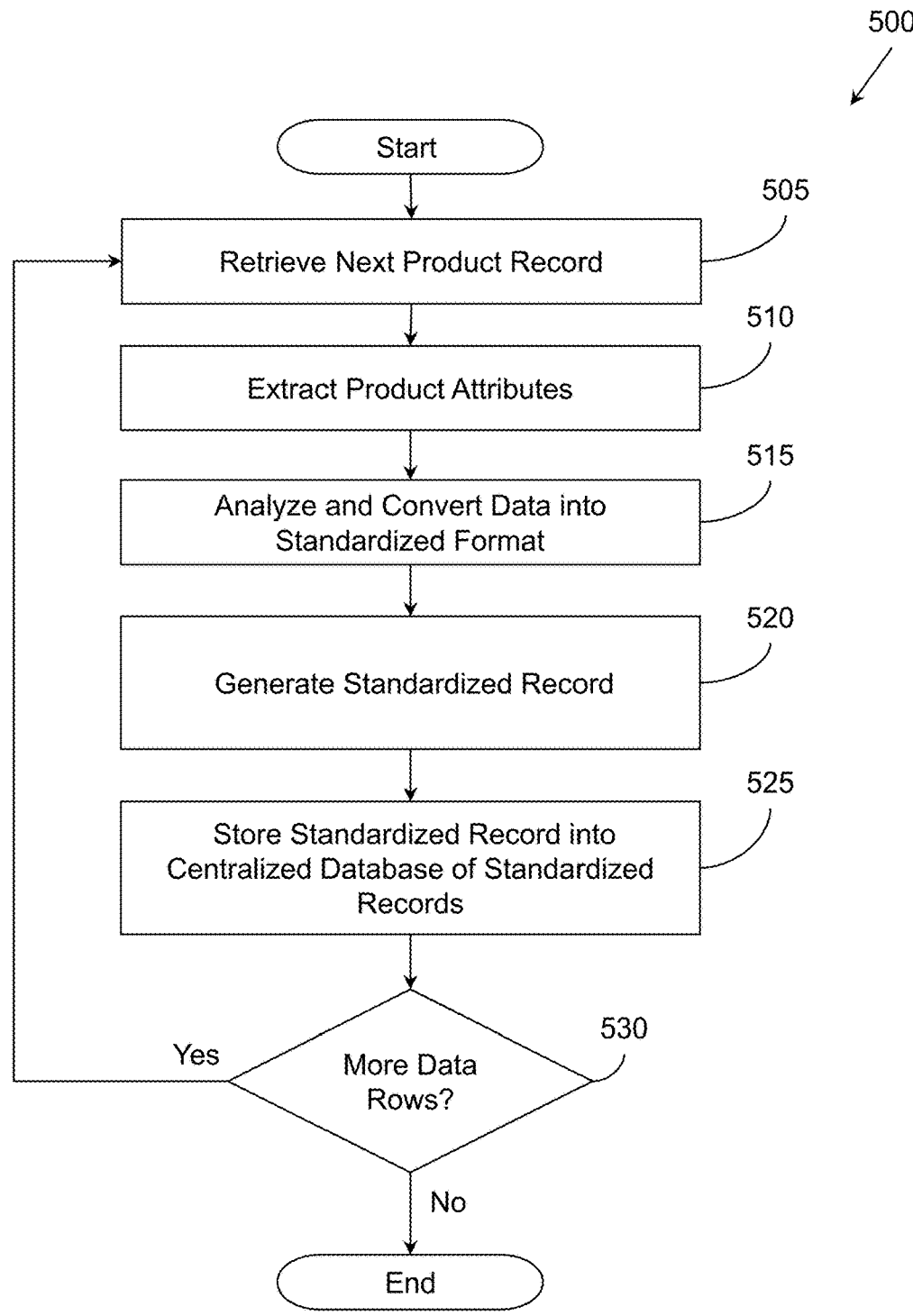
FIG. 5 illustrates one embodiment of a method system associated with extracting attributes and generating a central standardized database from non-standardized product records.

With reference to FIGS. 4 and 5, one embodiment of computer implemented method 400 and method 500 are illustrated that are associated with converting non-standardized product data from one or more data sources into standardized data for building a centralized standardized catalog database. Similar functions have been described with reference to FIGS. 1-3 that are performed by the catalog system 100 for building the centralized database 130. The catalog system 100 may be configured to perform the functions of method 400, method 500, and/or combinations of each.

With reference to FIG. 4, method 400 is one embodiment for the process of downloading product information from one or more source databases and training an ML model to assign class codes to products. This is similar to the data import and ingestion logic 110 (from FIGS. 1 and 2) and metadata extraction of FIG. 3.

At block 405, the system accesses, via a network interface, a first source database that contains records of product information for a plurality of products, wherein the product information is maintained in a non-standard format. The first source along with other data sources, may be identified as target data sources in a defined list with their network locations. Product information may then be downloaded in a similar manner as described with reference to the API reader 200 (FIG. 2).

As previously explained, in one embodiment, the downloaded data, which can have a variety of different formats, may be converted into Comma-Separated Values (CSV) format, Pipe-Separated Values (PSV), JSON format, XML format, or other designated data format. The following example is based on converting the downloaded data into CSV format. This creates a file with rows of data, where one row represents one product record and includes its product attributes separated by commas.

At block 410, the system may identify a selected set of metadata from the product information of a product from the plurality of products and extract the metadata that is identified for the associated product. This process may be similar to the metadata extractor 305 (FIG. 3) where the selected metadata included brand name, manufacturer name, and units of measure. The metadata is used to build the domain data 310 as previously explained, which includes a list of unique values from the selected metadata.

As previously explained, the system may access a plurality of source databases, wherein each source database is independent from each other and contains non-standardized product records. This data is downloaded as a whole or retrieved in part. For each of the non-standardized product records, the system generates a standardized record that includes at least a standardized text description of an associated product, a brand name, and a manufacturer name. As an overview, the system is building the centralized database by including the standardized records for each of a plurality of products from the plurality of source databases.

At block 415, a feature vector is generated using the extracted metadata for the associated product, which is based on a combination of brand, manufacturer, unit of measure. Feature vectors may be generated for each combination of metadata that is identified from the product information.

At block 420, the system may determine and assign a class code to the feature vector. As stated previously, the class code classifies the associated product based on product characteristics and product functions. Class codes may be determined from GUDID and/or UNSPSC databases, for example.

At block 435, a machine learning (ML) model may be trained to predict a class code for a target product based on the feature vectors of extracted metadata and assigned class codes determined from the plurality of products. As new product information is ingested by the system, some product records have unknown/unclassified product data (e.g., does not include a product classification). The ML model may predict and assign a class code to the new product based on similar feature vectors from the training dataset. This is similar to the functions of the classification module 315 (FIG. 3). The method continues to FIG. 5 for additional processing.

With reference to FIG. 5, method 500 continues the method 400 in one embodiment. In summary, method 500 performs attribute extraction from the product records in the CSV file, standardizes the product records, and generates a centralized database of standardized product records.

At block 505, an iterative process is executed to process the product records (e.g., data rows) from the CSV file. The process may start by retrieving and analyzing the first product record (e.g., first data row). For each product record of the plurality of products from the first source database that is now in the CSV file, the method extracts product attributes from the product information associated with the product (block 510).

As previously explained, the product attributes include at least a product description, a brand name, and a manufacturer name, but may include a variety of attributes, for example but are not limited to, product name, unique product ID, brand name, manufacturer name, product textual description including functions and/or specifications, size and dimensions (length, width, height, inner diameter, outer diameter), units of measure (UOM), material, color, product category or classification, or other type of information that may be included by the data source. In general, the attributes from different records are not uniformed and have a non-standard format, where the product description includes a non-standard text description.

At block 515, the system analyzes and converts the non-standard data into a standardized format. This includes converting the textual description of the product into a standard structure and format having a standardized text description. This process is similar to the standardization module 335 of FIG. 3 (see previous examples).

At block 520, the system generates a standardized record for the current record being processed that includes at least the standardized text description of the associated product, the brand name, and the manufacturer name. This will be performed for the other records in the dataset during the iterative process.

At block 525, a centralized database is generated and built that includes the standardized record for the current product. As previously explained, the standardized records of the products allow a search engine to match products in a uniformed manner based at least on the standardized text descriptions.

At block 530, the method determines if more product data rows exist in the downloaded filed (e.g., the CSV file). If all data rows have been processed, the method ends. If more data rows exist, the method returns to block 505 and retrieves the next data row/record. The method then repeats for each of the product rows/records until complete.

Method 500 may be repeated for product data downloaded from other data sources, each of which are independent from each other and contain non-uniformed and non-standardized data formats. The method 500 may be initiated at intervals or based on a trigger condition to obtain real-time (or near real-time) updated product data from the independent data sources. Thus, the centralized database contains real-time product data for access to remote consuming systems. In general, real-time refers to actions that happen immediately upon an event without a significant noticeable delay but may include time delays due to technical limitations for computer processing, network communications, etc. Thus, in real-time is not limited to being instantaneous.

With the present catalog system 100, disparate product data from multiple disparate data sources may be converted into a centralized database and repository of standardized product records. The present system provides one or more technical improvements over the independently operated and maintained product data sources. For example, the present system provides an intuitive interface empowering data curators to manage the entire data lifecycle efficiently in a centralized system. Improved data accuracy is achieved through advanced AI and machine learning models that standardize data records to create a more efficient database structure that is uniform for products. The present system harnesses the power of distributed processing for downloading and processing large amounts data from different data sources. The present centralized database provides a simplified user interface that allows users to access and search product data in a uniformed manner from a single repository location (e.g., one stop solution) rather than having to separately access remote independent data sources using customized user interfaces and different search strategies.

In one embodiment, the present centralized database system may be provided as a Data-as-a-Service (DaaS) system that aggregates, curates, transforms/standardizes, enriches, centralizes and provides access to one or more types of product data. The system may serve standardized product data to consuming systems and users, for example, that are searching to buy products for their organization and/or obtain product information. As explained, the present system may be implemented to operate in different industries, for example but not limited to, healthcare industries, automotive industries, electronics industries, energy and utility industries, aviation industries, computer system industries, and so on.

In a healthcare industry example, the product data may include but not limited to, medical devices, durable medical equipment, medical surgical supplies, as well as pharmaceutical and manufactured drug data. The system may serve standardized healthcare product data to consuming systems and users, for example, healthcare provider systems and ERP systems that are searching to buy products for their organization and/or obtain product information.

In an energy and utility embodiment, the present centralized database system may provide improved and standardized product data relating to system components but also energy supply and usage statistics for utility components, grids, and usage areas. The usage areas and associated usage statistics may be distinguished at different levels, for example, street level, block level, neighborhood level, city level, zip code level, county level, state level, etc. The present system may update the usage statistics in real-time or near real-time and maintain historical usage statistics based on time periods. The usage statistics, for example, may allow an energy company to perform efficient grid management based on having centralized data, perform predictive maintenance on system components based on usage information, and/or predict and control system configurations to perform energy conversation in designated areas, at designated time periods.

In an automotive industry embodiment, the present system may generate and serve standardized product data including vehicles, components and accessories, lubricants and fluids, repair tools, tires etc., to consuming systems of trading partners like original equipment manufacturers (OEMs), dealers, spare-parts retailers, and/or other systems.

The present centralized database also provides access to accurate and real-time (or near real-time) product information that improves clinical experiences, leading to better patient outcomes. Healthcare providers may benefit from the holistic end-to-end solution that streamlines operations and enhances clinical efficiency with the present standardized central database.

Cloud or Enterprise Embodiments

In one embodiment, the catalog system 100 is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the catalog system is a centralized server-side application that provides at least the functions disclosed herein and that is accessed by many users via computing devices/terminals communicating with a computing system (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 6:
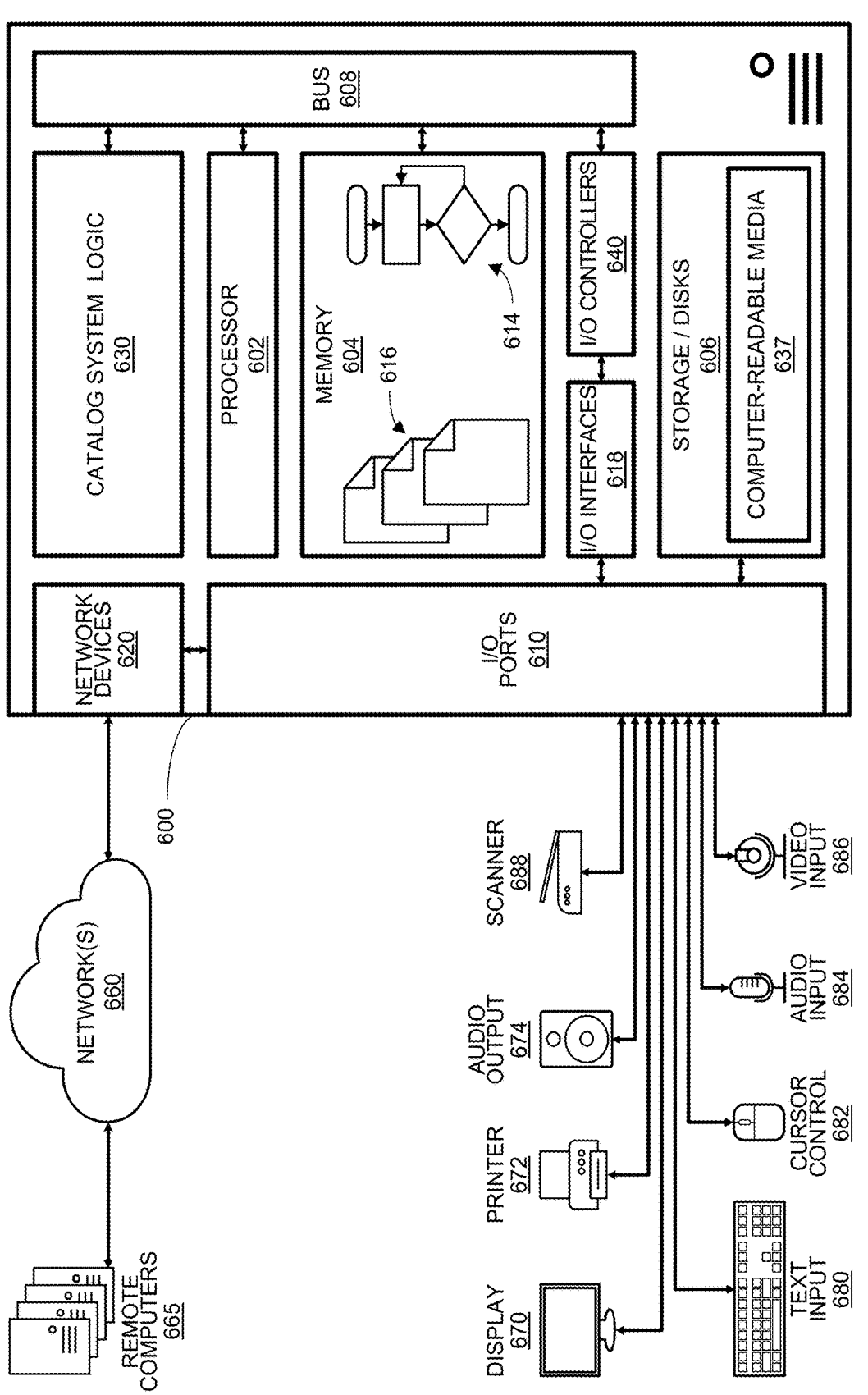
FIG. 6 illustrates an embodiment of a computing system configured with the example systems and/or methods disclosed.

FIG. 6 illustrates an example computing device that is configured and/or programmed as a special purpose computing device with one or more of the example systems and methods described herein, and/or equivalents. The example computing device may be a computer 600 that includes at least one hardware processor 602, a memory 604, and input/output ports 610 operably connected by a bus 608. In one example, the computer 600 may include catalog system logic 630 configured to facilitate generating a centralized product catalog with standardized product records/information from independent data sources similar to product catalog system 100 shown in one or more of FIGS. 1-5.

In different examples, the logic 630 may be implemented in hardware, a non-transitory computer-readable medium 637 with stored instructions, firmware, and/or combinations thereof. While the logic 630 is illustrated as a hardware component attached to the bus 608, it is to be appreciated that in other embodiments, the logic 630 could be implemented in the processor 602, stored in memory 604, or stored in disk 606.

In one embodiment, logic 630 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform one or more functions of the product catalog system 100. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for performing one or more of the disclosed functions and/or combinations of the functions.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output (I/O) interface (e.g., card, device) 618 and an input/output port 610 that are controlled by at least an input/output (I/O) controller 640. The disk 606 may be, for example, a magnetic disk drive, a solid-state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with, control, and/or be controlled by input/output (I/O) devices via the input/output (I/O) controller 640, the I/O interfaces 618, and the input/output ports 610. Input/output devices may include, for example, one or more displays 670, printers 672 (such as inkjet, laser, or 3D printers), audio output devices 674 (such as speakers or headphones), text input devices 680 (such as keyboards), cursor control devices 682 for pointing and selection inputs (such as mice, trackballs, touch screens, joysticks, pointing sticks, electronic styluses, electronic pen tablets), audio input devices 684 (such as microphones or external audio players), video input devices 686 (such as video and still cameras, or external video players), image scanners 688, video cards (not shown), disks 606, network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network 660. Through the network, the computer 600 may be logically connected to remote computers 665. Networks with which the computer 600 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed by at least one processor. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component or module that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which one or more communication channels are established that allow signals, data, messages, physical communications, and/or logical communications to be sent and/or received between the entities. An operable connection may include a physical interface, an electrical interface, and/or a data interface with one or more transmitters/receivers that communicate with wired and/or wireless signals. An operable connection may include differing combinations of interfaces and/or connections sufficient to establish and allow communication. For example, two entities can be operably connected to communicate signals to each other directly or through one or more intermediate entities (e.g., processor, operating system, logic, non-transitory computer-readable medium, internet communication devices, local network, etc.). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computing system, comprising:

one or more computing devices operably connected to communicate over one or more communication networks via one or more network interfaces;

at least one processor connected to at least one memory, wherein the at least one processor is operably connected to at least one of the one or more computing devices;

a non-transitory computer readable medium including instructions stored thereon that when executed by at least the processor cause the computing system to:

access, via the one or more network interfaces, a plurality of source databases that contain records of product information for a plurality of products, wherein the product information is maintained in a non-standard format;

wherein each source database of the plurality of source databases is independent from each other and contains non-standardized product records;

identify a selected set of metadata from the product information of an associated product from the plurality of products and extract the set of metadata that is identified for the associated product;

generate a feature vector using the extracted set of metadata for the associated product;

determine and assign a class code to the feature vector, wherein the class code classifies the associated product based on product characteristics and product functions;

train a machine learning model to predict a class code for a target product based on feature vectors of extracted metadata and assigned class codes determined from the plurality of products;

for each product record of the plurality of products from the plurality of source databases:

extract product attributes from the product information associated with each product;

wherein the product attributes include at least a product description, a brand name, and a manufacturer name, wherein the product description includes a non-standard text description;

analyze and convert the non-standard text description into a standard structure and format having a standardized text description of terminology based on a type of the associated product or a class code of the associated product; and generate a standardized record for each product record that includes at least the standardized text description of the associated product, the brand name, and the manufacturer name;

generate a centralized database that includes the standardized records for each of the plurality of products from the plurality of source databases;

wherein the centralized database synchronizes the non-standardized product records from the plurality of source databases based on the standardized records;

wherein the standardized records of the products allow a search engine to match products in a uniform manner based at least on the standardized text descriptions; and provide cloud-based network access to the centralized database that allows searching of product data in a uniform manner from a single repository location.

2. The computing system of claim 1, wherein the system is further configured to:

access a plurality of source databases by network communications, wherein each source database of the plurality of source databases is independent from each other and contains non-standardized product records;

for each of the non-standardized product records, generate a standardized record that includes at least a standardized text description of an associated product, a brand name, and a manufacturer name; and build the centralized database by including the standardized records for each of a plurality of products from the plurality of source databases.

3. The computing system of claim 1, wherein the system is further configured to:

generate a domain database that includes unique values identified from the selected set of metadata that is extracted from one or more of the plurality of source databases; and wherein the unique values include at least a list of brand names, a list of manufacturer names, and a list of units of measure associated with the plurality of products.

4. The computing system of claim 1, wherein the system is further configured to:

extract product attributes from the product information from each product record of the plurality of products and including identifying a classification of each product from an associated product record;

in response to the classification not being found in the product information, the machine learning model is caused to predict a class code for the product information based on at least a feature vector created from the product information; and assign and insert the predicted class code into the corresponding product information of an associated product record.

5. The computing system of claim 1, wherein the centralized database is a single repository that contains the standardized records that are converted from a plurality of independent data sources containing non-standardized product information; and wherein the computing system further includes a uniform user interface that allows remote access to the centralized database.

6. The computing system of claim 1, wherein the computing system is further configured to:

identify duplicate product records that describe the same product of an existing product record; and delete an identified duplicate product record.

7. The computing system of claim 1, wherein the system further includes a standardization module that is configured to convert the non-standard text description from a product record into a standard structure and format; and wherein the standardization module includes a generative artificial intelligence (AI) model configured to recognize textual descriptions and convert the textual descriptions into a designated standard structure of terminology based on a type of product.

8. A method implemented by a computing system including one or more computing devices, the method comprising:

accessing, via a network interface, a plurality of source databases that contains records of raw product information for a plurality of products, wherein the raw product information is maintained in a non-standard format;

wherein each source database of the plurality of source databases is independent from each other and contains non-standardized product records;

identifying a selected set of metadata from the raw product information of an associated product from the plurality of products and extract the set of metadata that is identified for the associated product;

generating a feature vector using the extracted set of metadata for the associated product;

determining and assigning a class code to the feature vector, wherein the class code classifies the associated product based on product characteristics and product functions;

training a machine learning model to predict a class code for a target product based on feature vectors of extracted metadata and assigned class codes determined from the plurality of products;

for each product record of the plurality of products from the plurality of source databases:

extracting product attributes from the raw product information associated with each product;

wherein the product attributes include at least a product description, a brand name, and a manufacturer name, wherein the product description includes a non-standard text description;

analyzing and converting the non-standard text description into a standard structure and format having a standardized text description; and generating a standardized record for each product record that includes at least the standardized text description of the associated product and one or more of the product attributes in a defined order of product attributes;

generate a centralized database that includes the standardized records for each of the plurality of products from the plurality of source databases;

wherein the centralized database synchronizes the non-standardized product records from the plurality of source databases based on the standardized records;

wherein the standardized records of the products allow a search engine to match products in a uniform manner based at least on the standardized text descriptions; and providing cloud-based network access to the centralized database that allows searching of product data in a uniform manner from the centralized database.

9. The method of claim 8, wherein the method further comprises:

for each of the non-standardized product records, generating a standardized record that includes at least a standardized attribute format comprising a text description of an associated product, a brand name, and a manufacturer name based on the defined order of product attributes; and wherein the centralized database synchronizes the non-standardized product records from the plurality of source databases based on the standardized attribute format and the standardized text descriptions.

10. The method of claim 8, wherein the method further comprises:

generating a domain database that includes unique values identified from the selected set of metadata that is extracted from one or more of the plurality of source databases; and wherein the unique values include at least a list of brand names, a list of manufacturer names, and a list of units of measure associated with the plurality of products.

11. The method of claim 8, wherein the method further comprises:

extracting product attributes from the raw product information from each product record of the plurality of products and identifying a classification of each product from an associated product record;

in response to the classification not being found in the raw product information, predicting, by the machine learning model, a class code for the raw product information based on at least a feature vector created from the raw product information; and assigning and inserting the predicted class code as a product attribute for the corresponding product of an associated product record.

12. The method of claim 8, wherein the centralized database is built as a single repository that contains the standardized records that are converted from the plurality of data sources containing non-standardized product information; and providing a uniform user interface that allows remote access to the centralized database.

13. The method of claim 8, wherein converting the non-standard text description from a product record into the standard structure and format further comprises:

executing a generative artificial intelligence (AI) model configured to recognize textual descriptions from the product records and convert the textual descriptions into a designated standard structure of terminology based on a type of product.

14. A non-transitory computer readable medium including instructions stored thereon that when executed by at least a processor of a computing system, wherein the computing system includes one or more computing devices, cause the computing system to:

access, via a network interface, a plurality of source databases that contain records of product information for a plurality of products, wherein the product information is maintained in a non-standard format;

wherein each source database of the plurality of source databases is independent from each other and contains non-standardized product records;

download one or more files from the plurality of source databases, wherein the one or more files contain the product information in the non-standard format;

identify, from the one or more files, a selected set of metadata from the product information of an associated product from the plurality of products and extract the set of metadata that is identified for the associated product;

generate a feature vector using the extracted set of metadata for the associated product;

determine and assign a class code to the feature vector, wherein the class code classifies the associated product based on product characteristics and product functions;

for each product record of the plurality of products from the plurality of source databases:

extract product attributes from the product information associated with each product;

wherein the product attributes include at least a product description, a brand name, and a manufacturer name, wherein the product description includes a non-standard text description;

analyze and convert the product attributes into a standard structure and format having a standardized text description for the product attributes; and generate a standardized record for each product record that includes at least the standard structure and format of the product attributes and a standardized text description of the associated product in a defined order of product attributes;

generate a centralized database that includes the standardized records generated for the plurality of products from the plurality of source databases;

wherein the centralized database synchronizes the non-standardized product records from the plurality of source databases based on the standardized records;

wherein the centralized database of standardized records of the products is configured to provide uniform access to the standardized records; and provide cloud-based network access to the centralized database that allows searching of product data in a uniform manner from the centralized database.

15. The non-transitory computer readable medium of claim 14, further comprising instructions that when executed cause the computing system to:

access the plurality of source databases and retrieve one or more non-standardized product records;

for each of the non-standardized product records, generate a standardized record that includes at least a standardized text description of an associated product, a brand name, and a manufacturer name; and build the centralized database by including the standardized records for each of a plurality of products from the plurality of source databases.

16. The non-transitory computer readable medium of claim 14, further comprising instructions that when executed cause the computing system to:

generate a domain database that includes unique values identified from the selected set of metadata that is extracted from one or more databases from the plurality of source databases; and wherein the unique values include at least a list of brand names, a list of manufacturer names, and a list of units of measure associated with the plurality of products.

17. The non-transitory computer readable medium of claim 14, further comprising instructions that when executed cause the computing system to:

extract product attributes from the product information from each product record of the plurality of products and identifying a classification of each product from an associated product record;

in response to the classification not being found in the product information, submit a request to a machine learning model to predict a class code for the product information based on at least a feature vector created from the product information; and assign and insert the predicted class code into the corresponding product information of an associated product record.

18. The non-transitory computer readable medium of claim 14, wherein the centralized database is generated as a single repository that contains the standardized records that are converted from the plurality of data sources; and wherein the computing system further includes a uniform user interface that allows remote access to the centralized database.

19. The non-transitory computer readable medium of claim 14, further comprising instructions that when executed cause the computing system to:

identify duplicate product records that describe the same product of an existing product record; and delete an identified duplicate product record.

20. The non-transitory computer readable medium of claim 14, further comprising instructions that when executed cause the computing system to:

convert the non-standard text description from a product record into the standard structure and format; and wherein the converting includes executing a generative artificial intelligence (AI) model configured to recognize textual descriptions from a product record and convert the textual descriptions into a designated standard structure of terminology based on a type of product determined from the product record.

* * * * *